Patented Aug. 18, 1942

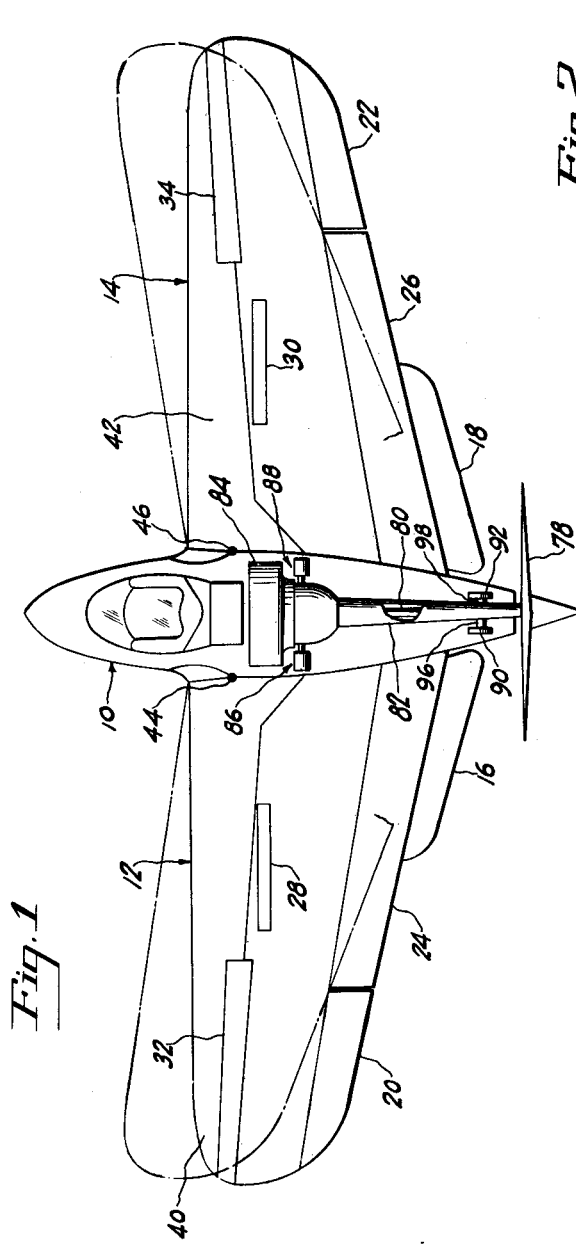

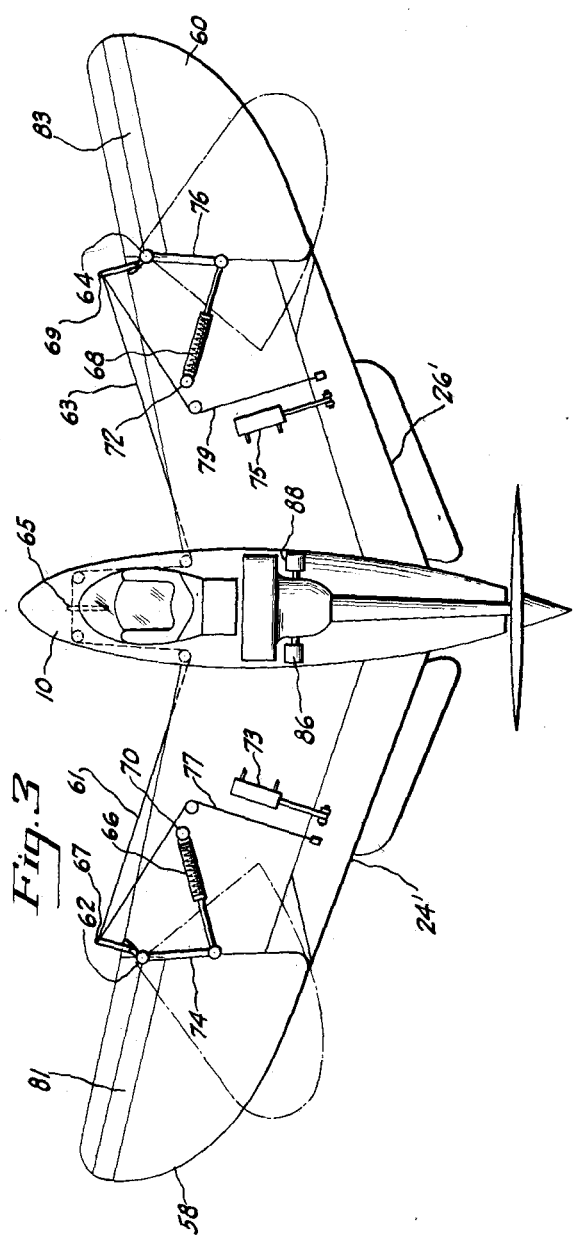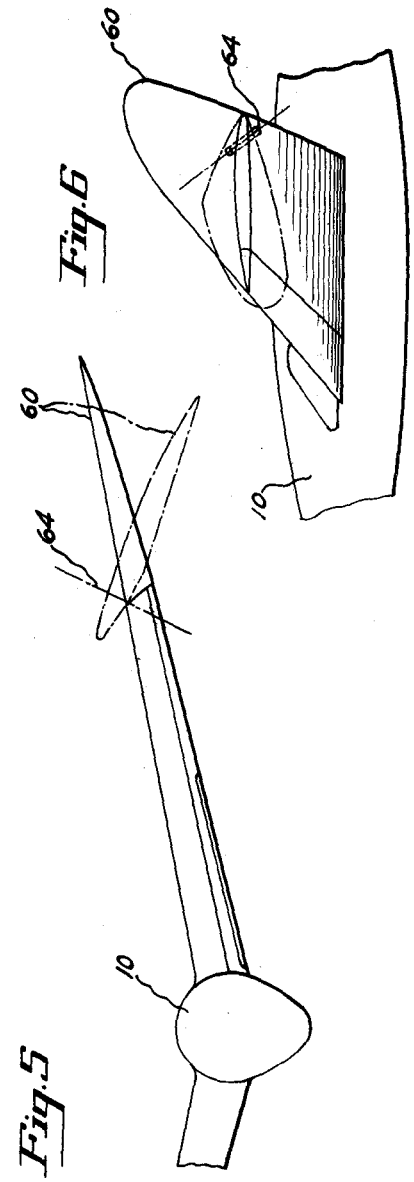

2,293,644

UNITED STATES PATENT OFFICE 2,293,644

TAILLESS AIRPLANE

Michael E. Gluhareff, Stratford, Conn., assignor to United Aircraft Corporation, East Hartford, Conn., a corporation of Delaware Application June 29, 1939, Serial No. 281,821

11 Claims. (Cl. 244—13)

This invention relates to improvements in supporting, balancing and propelling means for aircraft and has particular reference to improved supporting and propelling means for tailless airplanes and sailplanes.

An object of the invention resides in the provision of means for increasing the lift and efficiency of the aircraft supporting surfaces while maintaining the position of the center of lift as a whole of said surfaces substantially unchanged.

A further object resides in the provision of means for changing the attitude of an aircraft propelling means from a position adapted for maneuvering the aircraft on the ground to a flight attitude and vice versa.

A somewhat more general object resides in the provision of a tailless airplane especially equipped for safe and convenient landing and take-off and for efficient flight.

Other objects and advantages will be more particularly pointed out hereinafter or will become apparent as the description proceeds.

In the accompanying drawings in which like reference numerals are used to designate similar parts throughout, there is illustrated a suitable mechanical arrangement of an airplane constructed according to the invention and one somewhat modified form thereof. The drawings, however, are for the purpose of illustration only and are not to be taken as in any way limiting or restricting the scope of the invention as set forth in the appended claims.

In the drawings,

Fig. 1 is a top plan view of an airplane constructed according to the invention.

Fig. 2 is a side elevational view of the airplane shown in Fig. 1.

Fig. 3 is a top plan view of a somewhat modified form of airplane constructed according to the invention.

Fig. 4 is a plan view of a fragmentary portion of the aircraft shown in Fig. 1 particularly illustrating the wing moving means.

Fig. 5 is a front elevational view of a fragmentary portion of the airplane shown in Fig. 3, and Fig. 6 is an end view of one of the wings of the airplane shown in Fig. 3.

Referring to the drawings in detail, the numeral 10 generally designates the fuselage, hull or cabin of an airplane and the numerals 12 and 14 designate the left hand and right hand supporting wings respectively. As shown the fuselage 10 is a comparatively short, completely streamlined, body and the usual tail or empenage is omitted. In the form illustrated the wings 12 and 14 project outwardly from a position near the vertical center of the fuselage and are inclined somewhat upwardly from their root to their tip ends to provide the usual dihedral angle essential to flight stability. The chord length of the root portions of the wings overlaps the greater portion of the length of the fuselage or cabin and the trailing edges of the wings incline forwardly at a moderate angle, generally known as sweepforward.

The elevation changing attitude, or angle of attack, of the airplane is controlled by a pair of elevators 16 and 18 in the form of movable flaps hinged to the trailing edges of the wing flaps adjacent to the root portions of the respective wings. Lateral control, or the bank and turn attitude, of the airplane is effected by a pair of ailerons 20 and 22 hinged to the rearward edges of the respective wings at the outer or tip portions of the wings. These ailerons include spoilers 32—34 used to produce a positive yaw in banking. Wing lift changing flaps 24 and 26 constitute the rearward portions of the respective wings between the inner ends of the ailerons 20 and 22 and the adjacent side of the fuselage 10, and the elevations 16 and 18 are carried by the rearward or trailing edges of the respective movable flaps 24 and 26, thus placing the elevators entirely to the rear of the main wing structures. This arrangement of the elevators and the forward inclination of the rear edges of the wings places the ailerons 20 and 22 a considerable distance ahead of the respective elevators 16 and 18 and brings the ailerons sufficiently near the axis of the center of lift of the wings so that operation of the ailerons to change the banking attitude of the airplane does not materially affect the pitching stability of the airplane, and places the elevators in a position sufficiently to the rear of the axis of the center of lift so that the control of the angle of attack as obtained by the elevators is sufficiently sensitive.

If desired, the wings may be additionally provided with controllable lift-increasing airflow slots as indicated at 32 and 34 and with lift spoilers as indicated at 28 and 30 to provide a glide control.

In the construction illustrated in Fig. 1, the rigid wing portion 40 is pivotally connected at its inner end to the side of the fuselage 10 by a substantially vertical pivot 44 and the wing portion 42 is connected to the fuselage by a similar pivot 46. At their rearward inner corners the wing portions 40 and 42 are connected to the respective ends of aligned laterally movable elements as indicated at 48 and 50. The elements 48 and 50 may be carried upon the outer ends of respective shafts 52 and 54 which may be moved simultaneously outwardly or inwardly by suitable means such as a hydraulic ram device or screw jack, as indicated at 56.

As is well known, the lowering of lift increasing flaps such as the flaps 24 and 26 changes the aerodynamic characteristics of the wings to which the flaps are attached in a manner to increase the lift coefficient of the wings thereby making it possible to maintain the necessary wing lift at greatly reduced flying speeds. This change in the aerodynamic characteristics, however, also includes a change in the position of the axis of the centers of lift of the wings so that when the flaps are inclined downwardly to increase the lift coefficient the center of lift is simultaneously moved rearwardly resulting in a nose heavy condition of the airplane. In conventional airplanes this shift of the center of lift, if not too great, may be compensated by adjusting the horizontal surface of the tail group or empenage to cause a downward thrust on the tail balancing the nose heavy condition occasioned by lowering the flaps. This arrangement is not entirely satisfactory since in many cases the rearward horizontal surface has to be adjusted to such a critical condition that a sudden change in speed or a local disturbance in the air may momentarily upset the fore and aft stability of the airplane. In the case of a tailless airplane, such as that illustrated, it is obvious that the desired compensation cannot be obtained in the manner above indicated. In the form of the device illustrated, when the flaps 24 and 26 are lowered or the wing otherwise altered to increase its lift coefficient the same suitable mechanism interconnected with or controlled by the flap moving device (not illustrated), such as the hydraulic ram or jack 56, is simultaneously operated to move the elements 48 and 50 outwardly thereby swinging the wings 12 and 14 forwardly to the position indicated by the broken lines in Fig. 1. With this arrangement, as the axis of the centers of lift is moved rearwardly by the operation of the lift increasing devices, the wings are simultaneously moved forward so that the centers of lift are retained in the same relative location with respect to the longitudinal dimension of the airplane and complete longitudinal stability is retained. The wing slots 32 and 34 may also be brought into operation simultaneously with the lowering of the flaps 24 and 26 to increase the effectiveness of the portions of the wings ahead of the ailerons for better lateral control at slow speeds. The lift spoilers 28 and 30 are particularly useful when the pilot wants to change his angle of gliding by simply increasing the drag and decreasing the lift, without changing the general set up of wings and flaps.

In the form of the invention shown in Figs. 3 and 5 only the outer or tip portions of the wings, as indicated at 58 and 60, respectively, are movable to compensate for the tendency of the center of lift to move rearwardly when the wing is changed to increase its lift coefficient. Also these portions of the wings may act as ailerons by moving them separately forward or aft to control the lateral movements of the airplane and assist in controlling the directional movements thereof. Each of the wing tips 58 and 60 is secured to the end of the respective fixed wing portion by an inclined pivot, as indicated at 62 and 64, respectively. These pivots 62 and 64 are inclined in such a manner that, when the movable tip portions 58 and 60 are in their rearward position, as indicated by broken lines in Fig. 3, the rearward portion of each tip portion is slightly above the forward edge thereof thus giving the movable tip portions a negative angle of incidence and, as the tip portions are moved towards their forward position, as shown in full lines in Fig. 3, this negative incidence decreases until the incidence of the tip portions is substantially neutral or slightly positive when the portions are in their forward positions. In flight both tip portions would normally be in the rearward position and it is apparent that moving one tip portion toward its forward position would simultaneously decrease the drag and increase the lift of the wing portion to which it is attached. This would cause the respective wing to rise and at the same time advance with respect to the opposite wing thus giving a simultaneous turning and banking movement to the airplane. The positive yaw effect produced by this arrangement renders a rudder for the airplane unnecessary. The wing tip portions may be individually moved by suitable means such as the cables 61 and 63 connected to the control column 65 and to the arms 67 and 69 connected to the respective tip portions 58 and 60 adjacent to the pivots 62 and 64. A pull imparted to either one of these cables by the control column 65 moves the respective wing tip forwardly. If desired, springs as indicated at 66 and 68 pivotally connected to the respective wing tips by the lever arms 74 and 76 and may be provided to assist the air forces in returning the wing tips to their rearward position when the pull on the cable is released.

When the lift coefficient increasing flaps 24' and 26 are lowered to place the airplane in landing position, the movable wing tip portions 58 and 60 are simultaneously moved to their forward position. The flap may be lowered by some suitable mechanism such as the hydraulic devices, schematically shown at 73 and 75, and the tip portions may be moved to their forward positions upon lowering the flap by some suitable connection such as the cables schematically shown at 77 and 79 connected to the arms 67 and 69. When both tip portions are moved to their forward position for landing lateral control of the aircraft is provided by the lift-spoilers or variable slots 81 and 83 which act to decrease the lift of one end of the wing and at the same time increase the drag thereof in a manner well known to the art, to give a positive yaw with the induced roll so that the proper turn and bank may be obtained without the use of a rudder. The lift spoilers may be operated by the same control 65 that moves the movable wing tips, an interchangeable connection being provided, or a separate control means may be provided for them. Slots 81 and 83 do the same work as slots 32 and 34 in Fig. 1.

The airplane shown by way of example in the accompanying drawings are of what is commonly known as the pusher type, that is, the propeller is located to the rear of the wings. In order to have the thrust line of the propeller pass through or near to the center of gravity and center of resistance of the airplane to avoid unbalanced propulsive forces, it is necessary that the lower portion of the propeller disc extend below the fuselage. This would mean that, if maintained in its normal flight position, there would be danger of the propeller striking the ground during the landing and take-off of the airplane.

In order to have the propeller in the proper position for flight and at the same time avoid the danger of the propeller striking the ground the powerplant is pivotally mounted so that the propeller can be tilted upwardly from the flight position shown in full lines in Fig. 2 to the landing and take-off position shown in broken lines. In the illustrated arrangement, the propeller 78 is mounted upon the end of a drive shaft 80 which extends rearwardly through a supporting tube 82 from the driving end of the engine 84. Pivotal mounts 86 and 88 are provided on a line passing through or near to the center of gravity of the powerplant for the tilting movement explained above in connection with Fig. 2. The distance of the propeller from the engine is such that an upward inclination not in excess of thirty degrees will bring the lower edge of the propeller disc above the bottom of the fuselage, or at least to a position in which the propeller safely clears the ground. Suitable means are provided for tilting the powerplant about the axis of the pivotal supports 86 and 88, such means taking the form, in the case illustrated, of a pair of upstanding arcuate guides 90 and 92 rigidly secured at their lower ends to the fuselage 10 and disposed one upon each side of the tube 82, and a cable 94 which extends over pulleys at each end of the guide member and is connected to one of the two guide pins 96 and 98 which extend from the tube 82 into elongated curved slots, as indicated at 100, in the guide members. The cable 94 may be suitably guided to the cock-pit of the airplane and there connected with a manually controllable actuating device, as indicated at 102, by means of which the cable may be operated to tilt the powerplant in the manner indicated above. If desired, a pair of cables may be used disposed one at each side of the tube 82 and associated respectively with the parallel guide members 90 and 92.

While a particular structural arrangement of an airplane and one somewhat modified form thereof has been illustrated in the accompanying drawings and hereinabove described in order to disclose the invention, it is to be understood that the invention is not limited to the particular arrangement so illustrated and described, but that such changes in the size, shape and arrangement of the various components thereof may be resorted to as come within the scope of the subjoined claims.

Having now described the invention so that others skilled in the art may clearly understand the same, what it is desired to secure by Letters Patent is as follows:

1. In an aircraft having wings provided with lift coefficient increasing devices, means for moving said wings to a position generally forward of their normal flight position to compensate for any change in the position of the center of lift of said wings occasioned by the operation of said lift coefficient increasing devices.

2. In an aircraft having wings provided with lift coefficient increasing devices which tend to shift the axes of the center of lift of said wings rearwardly when operative, means mounting said wings for fore and aft movement, and means for moving said wings generally forward as the axis of the center of lift thereof is shifted rearwardly.

3. In an aircraft having wings provided with lift coefficient increasing devices which tend to shift the axes of the center of lift of said wings rearwardly when operative, means mounting at least a portion of each wing for fore and aft movement, and means for moving said wings generally forward as the axis of the center of lift thereof is shifted rearwardly.

4. In an aircraft having wings provided at the inner rear portions thereof with tiltable lift coefficient increasing flaps, means for movably mounting at least a portion of each wing, and means for moving said movable wing portions to avoid a change in the position of the center of lift of said wings upon operation of said flaps.

5. In an aircraft having wings provided at the inner rear portions thereof with tiltable lift coefficient increasing flaps, members adjustable to control the longitudinal flight attitude of said airplane hinged to the rear inner portions of said flaps, and means for controlling the lateral flight attitude of said airplane hinged to the rear edges of said wings at the outer ends of said flaps.

6. In an aircraft having wings provided at the inner rear portions thereof with tiltable lift coefficient increasing flaps, members adjustable to control the longitudinal flight attitude of said airplane hinged to the rear inner portions of said flaps, and means for controlling the lateral flight attitude of said airplane hinged to the rear edges of said wings at the outer ends of said flaps, the rear edge of each wing being inclined outwardly and forwardly to position said lateral control members ahead of said longitudinal control members.

7. In a tailless wing supported aircraft, a relatively short fuselage, a wing at each side of said fuselage each wing having its rearward edge inclined outwardly and forwardly, a lift coefficient increasing flap along the inner portion of the rear edge of each wing, an aileron along the outer portion of the rear edge of each wing, and a horizontal elevator along the inner portion of the rear edge of each flap.

8. In a tailless wing supported aircraft, a relatively short fuselage, a wing at each side of said fuselage each wing having its rearward edge inclined outwardly and forwardly, a lift coefficient increasing flap along the inner portion of the rear edge of each wing, an aileron along the outer portion of the rear edge of each wing, and a horizontal elevator along the inner portion of the rear edge of each flap and lift spoilers in each wing for assisting said ailerons in maintaining lateral and directional control of said airplane.

9. In an airplane having a fuselage and wings disposed one at each side of said fuselage, a relatively fixed wing portion extending longitudinally of each wing and rigidly secured to said fuselage, movable wing tips carried by said fixed portions, pivotal connections having inclined axes securing said wing tips to said fixed wing portions, the inclination of said axes being such as to decrease the angle of attack of said tip portions as they are moved rearwardly, and means for moving said tip portions about said pivotal connections in generally fore and aft directions.

10. In an aircraft having a fuselage and wings disposed one at each side of said fuselage, a rigidly fixed portion extending longitudinally of each wing and rigidly secured to said fuselage, movable wing tip portions carried by said fixed wing portions, means for moving said tip portions together in the same direction to change the lift characteristics of said wings, means for moving said tip portions and changing their angle of incidence independently to render said tip portions effective as ailerons for lateral control of said aircraft, and a pivotal connection having its axis inclined outwardly and rearwardly from bottom to top securing each wing tip to the respective fixed wing portion, whereby the angle of incidence of said tip portions will be decreased as the tip portions are moved rearwardly about their respective pivotal connections.

11. In a wing supported tailless aircraft, a body portion, a wing extending outwardly from each side of said body portion each wing comprising, a longitudinally extending supporting portion attached to said body portion by a respective pivotal connection, and at least one lift varying portion movable relative to said supporting portion and carried thereby, each pivotal connection having its axis substantially at right angles to both the spanwise axis and the chordwise axis of the wing, and means for moving said wings about said pivotal connections to move their tip portions between a normal position and a position disposed forwardly of said normal position.

MICHAEL E. GLUHAREFF.